April 16, 1957 E. GOSMANN 2,789,194
ARTICLE-WORKING APPARATUS
Filed Nov. 26, 1954 3 Sheets-Sheet 1
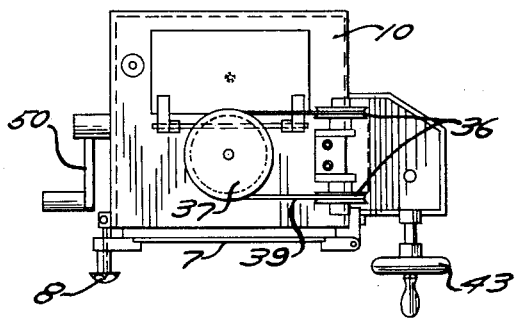
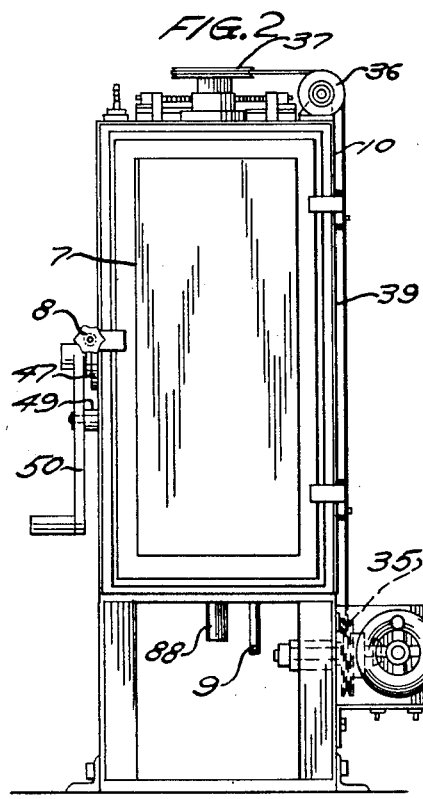
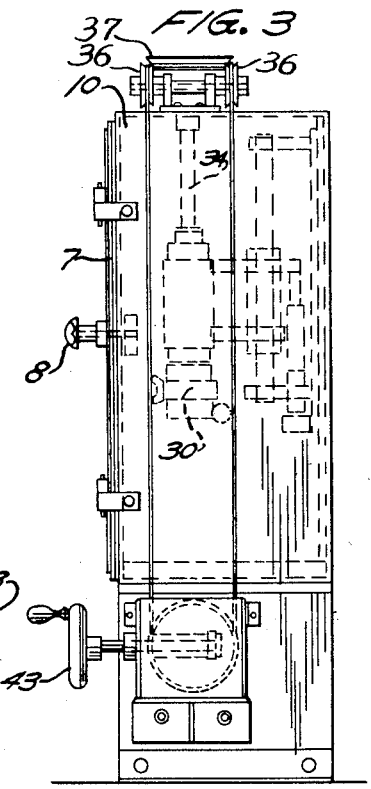
INVENTOR.
E. GOSMANN
BY C. B. Hamilton
ATTORNEY

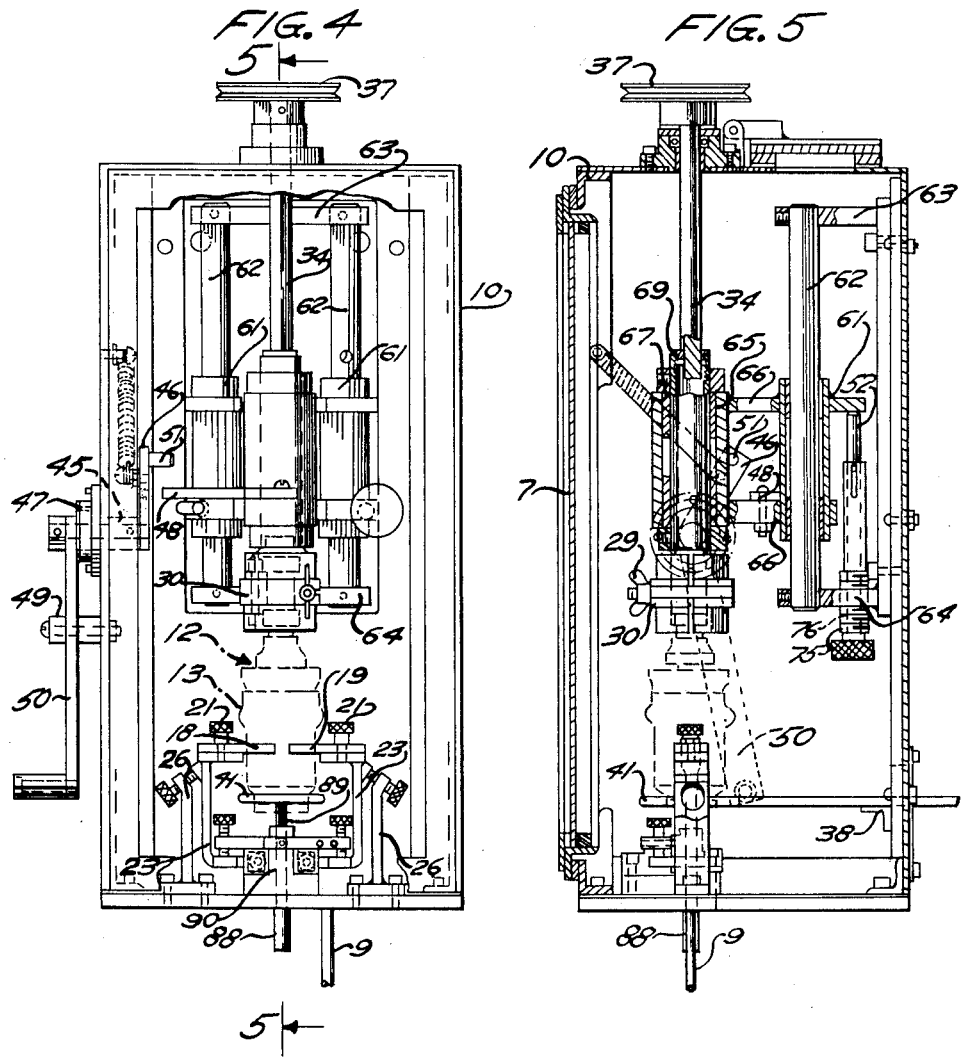

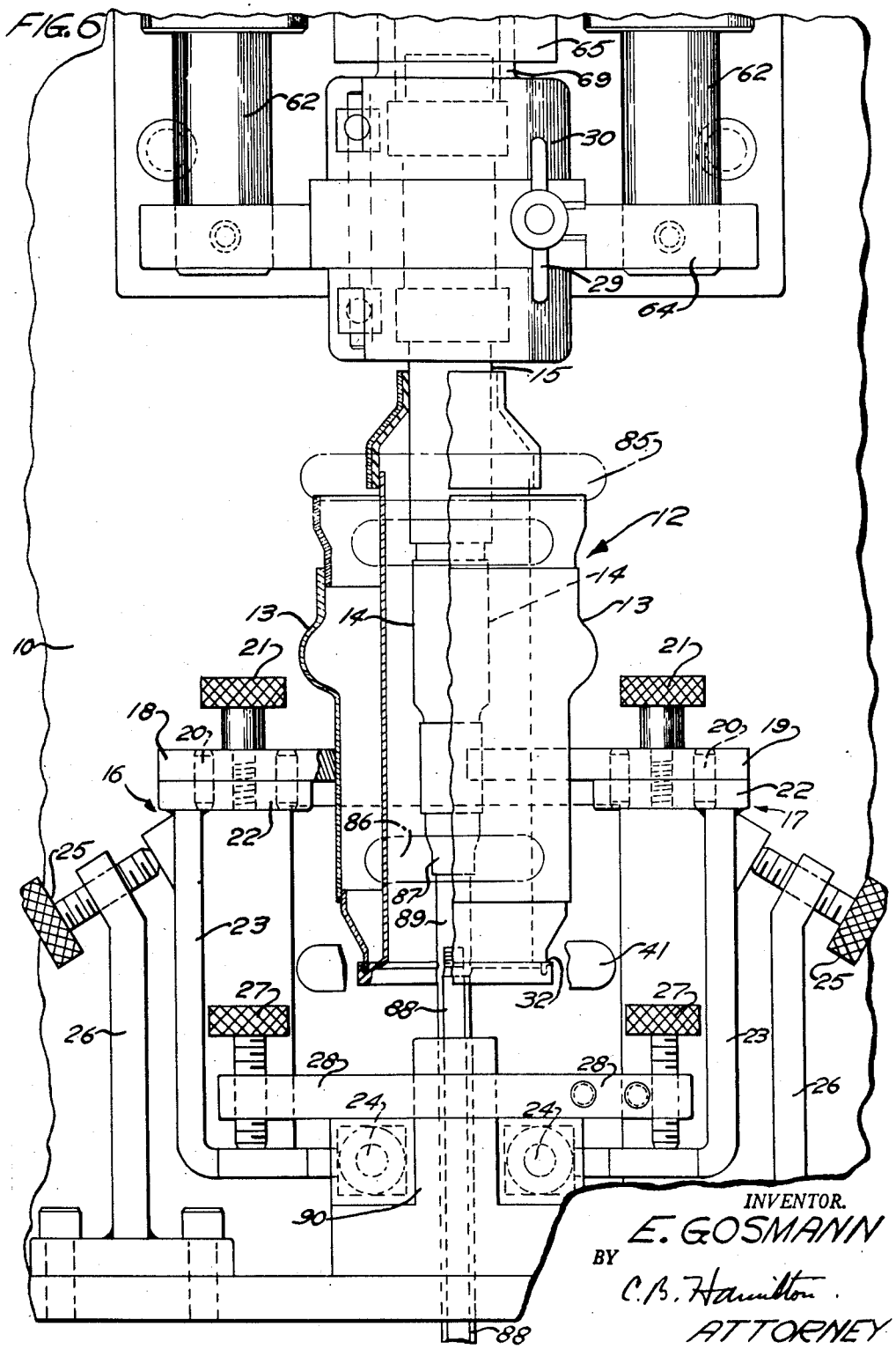

United States Patent Office 2,789,194
Patented Apr. 16, 1957

2,789,194

ARTICLE-WORKING APPARATUS

Enart Gosmann, La Grange, Ill., assignor to Western Electric Company, Incorporated, New York, N. Y., a corporation of New York Application November 26, 1954, Serial No. 471,237

9 Claims. (Cl. 219—10.43)

This invention relates to article-working apparatus, and more particularly to apparatus for disassembling brazed magnetron parts.

In the salvage of brazed or soldered parts from assemblies, such as, for example, magnetron cathode assemblies wherein many parts are brazed together to form an assembly or unit, the brazed joints must be broken, and it is desirable that they be broken smoothly. However, in the past, it has been very difficult to break the brazed parts of such an assembly smoothly from one another.

An object of the invention is to provide apparatus for unbrazing magnetron parts without damage thereto.

Another object of the invention is to provide apparatus for breaking brazes of articles under heat without leaving ragged edges.

A further object of the invention is to provide apparatus for heating brazed joints of magnetron assemblies and turning the parts of the magnetrons as the brazes are melted to spin the melted brazing material and leave smooth surfaces on the parts disassembled thereby.

An apparatus illustrating certain features of the invention may include means for gripping one element of an assembly including a second element brazed to the first element, means for gripping the second element and means for heating the brazed joint. Means also may be provided for exerting torque between the two elements being unbrazed to spin the melted brazing material and for exerting thrust between the two elements to separate them.

A complete understanding of the invention may be obtained from the following detailed description of an apparatus forming a specific embodiment thereof, when read in conjunction with the appended drawings, in which Fig. 1 is a top plan view of an apparatus forming one embodiment of the invention;

Fig. 2 is a front elevation of the apparatus shown in Fig. 1;

Fig. 3 is a side elevation of the apparatus shown in Fig. 1;

Fig. 4 is an enlarged side elevation of the apparatus shown in Fig. 1 with portions thereof broken away;

Fig. 5 is a vertical section taken along line 5—5 of Fig. 4, and

Fig. 6 is an enlarged, fragmentary front elevation of a portion of the apparatus shown in Fig. 1.

Referring now in detail to the drawings, there is shown therein an apparatus including a chamber 10, which is hermetically sealed when a door 7 is closed and latched by a latch 8. The chamber may be filled with an inert reducing gas, such as, for example, forming gas or a gas including about 90% nitrogen and 10% hydrogen supplied thereto by a supply conduit 9 leading to a source of the gas under a low pressure. A magnetron cathode mount 12 (Fig. 6), which includes an envelope 13, a cathode support cylinder 14, a cathode envelope and a heater connector assembly 15, is first mounted in the chamber. Then, non-rotatable clamps 16 and 17 including replaceable plates 18 and 19, respectively, secured by pins 20 and thumb screws 21 to plates 22 of arms 23 mounted pivotally on pins 24 are pressed by thumb screws 25 threadably supported by fixed posts 26 into clamping engagement with the envelope 13. A split clamp 30 is fastened to the assembly 15 by a wing nut latch 29. Thumb screws 27 mounted on fixed arms 28 limit the movement together of the arms 23 and center the assembly 12. The door 7 then is closed and latched by the latch 8 to seal the chamber 10, and the reducing gas is introduced into the chamber 10 to fill it through the supply conduit 9.

An induction coil 41 (Fig. 6) mounted on a bracket 33 at the back of the chamber 10 then is actuated to heat a solder joint 32, and a hand wheel 43 (Figs. 1, 2 and 3) is actuated to drive, through pulleys 35, 36 and 37 and a belt 39, a spindle 44 to which the clamp 30 is splined to rotate the rest of the cathode mount 12 relative to the envelope 13 as the joint 32 melts so that the brazing material of the joint is spread smoothly on the separated parts. A hand lever 50 is moved manually away from a stop 49 to turn a shaft 45 in a bearing and seal 47 to swing an arm 46 upwardly to lift a pin 51 away from a plate 48 to permit a spring-pressed plunger 52 (Fig. 5) to raise the clamp 30 relative to the clamping plates 18 and 19 to push the clamp 30 against the spring-pressed plunger 52. Initially, when the arm 50 is against the stop 49, the pin 51 holds the plate 48 down. The plate 48 is fixed to sleeves 61 mounted slidably on guide rods 62 rigidly mounted on plates 63 and 64 fixed to the wall of the housing. A bearing or sleeve 65 secured rigidly to the sleeves 61 by arms 66 supports a hollow shaft 67 fastened rigidly and adjustably by a set screw 68 to a hollow shank 69 supporting the split clamp 30, the shank 69 being splined to the shaft 34. Collars 70 of the shaft 67 prevent axial movement between the shaft 67 and the bearing 65. An adjustable sleeve 75 threaded into a bore 76 in the bracket supports the rod 52 slidably and contains the spring urging the rod 52 upwardly.

After the envelopes 13 have been removed from the mounts 12, the induction coil 41 may be removed and an induction coil 85 substituted therefor to remove the cylinder 14 from the remainder of the apparatus, after the plates 18 and 19 have been replaced by similar plates fitting the cylinder 14. The apparatus also may be set up with an induction coil 86 for melting a joint 87, at which time a push rod 88 slidable in a guide 90 and threaded into a connector 89 of the cathode mount may be moved upwardly to free the connector 89 from the rest of the mount. An opening 92 covered by a door 93 is provided for maintenance purposes.

The above-described apparatus serves to rapidly disassemble the component parts of the cathode mounts without oxidation of the parts and leaves the brazing material spun out in smooth thin films on the parts so that non-defective parts may be reused. The apparatus may be quickly loaded and unloaded, and also may be quickly set up for unbrazing runs of each brazed joint.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An article-working apparatus, which comprises means for clamping one part of an article against rotation, a second clamping means for clamping another part of the article bonded to the first part, means mounting the second clamping means rotatably on an axis directed toward the first clamping means, means urging the second clamping means along said axis, means for holding the second clamping means against the action of the urging means, and means for heating the portion of the article forming the juncture of said parts to soften bonding material bonding the parts together.

2. An article-working apparatus, which comprises clamping means for clamping an article against rotation, a second clamping means juxtapositioned with respect to the first clamping means for clamping another part of the article, means mounting the second clamping means rotatably on an axis extending from the first clamping means, means for rotating the second clamping means, and means for heating a bonding portion of the article held by the clamping means to soften the bonding portion.

3. An article-working apparatus, which comprises clamping means for clamping an article against rotation, a second clamping means aligned with the first clamping means for clamping another part of the article, means urging the second clamping means away from the first clamping means, means for holding the second clamping means against the action of the urging means, and means for heating a bonding portion of an article held by the clamping means to soften the bonding portion.

4. An apparatus for disassembling brazed magnetron parts, which comprises a chamber, a clamp mounted in one end of the chamber for clamping a tubular part of a magnetron brazed to a second tubular part and hold the first part against rotation, a rotatable shaft, a second clamp splined to the shaft for clamping the second part of the magnetron for rotating the second part, means for urging the second clamp away from the first clamp, means for pressing the second clamp against the action of the urging means, and means operable exteriorly of the chamber for rotating the shaft.

5. An apparatus for disassembling brazed magnetron parts, which comprises a vertical chamber, a clamp mounted in the bottom of the chamber for clamping a tubular part of a magnetron brazed to a second tubular part to hold the first part against rotation, means for clamping the second part of the magnetron, a shaft to which the second clamp is splined for rotating the second part, a pair of guide rods extending parallel with the shaft, sleeves mounted slidably on the guide rods for supporting the second clamp, a spring-pressed plunger for urging the sleeves upwardly away from the first clamp, a crank having a handle portion outside of the housing and an actuating pin inside the housing for pressing the sleeves downwardly against the action of the urging means, a pulley mounted on the shaft, and means for rotating the pulley.

6. An apparatus for disassembling brazed magnetron parts, which comprises a chamber, a clamp mounted in one end of the chamber for clamping a tubular part of a magnetron brazed to a second tubular part to hold the first part against rotation, means for clamping the second part of the magnetron, a shaft to which the second clamp is splined for rotating the second part, a pair of guide rods extending along the shaft, sleeves mounted slidably on the guide rods for supporting the second clamp rotatably, a spring-pressed plunger for urging the sleeves away from the first clamp, means operable from outside of the housing for pressing the sleeves against the action of the urging means, and means for rotating the shaft.

7. An apparatus for disassembling brazed magnetron parts, which comprises a chamber, means for introducing gas under pressure into the chamber, an induction heating coil positioned between the ends of the chamber, means located at one end of the chamber for clamping one part of a magnetron assembly on one side of the induction heating coil to position a brazed joint of the assembly in the heating coil, a shaft extending through the end of the chamber at the opposite end of the coil from that of the clamp, a second clamp splined to the shaft for clamping a second part of the magnetron assembly, a carriage supporting the second clamp, means guiding the carriage for movement parallel to the axis of the shaft, means urging the carriage away from the induction heating coil, a bearing extending through a side of the chamber, a crank shaft mounted rotatably in the bearing, a handle fixed to the crank shaft on the outside of the housing, and a crank arm keyed to the shaft for pressing the carriage toward the induction heating coil.

8. An apparatus for disassembling brazed magnetron parts, which comprises a chamber, means for introducing gas under pressure into the chamber, an induction heating coil positioned between the ends of the chamber, means for clamping one part of a magnetron assembly on one side of the induction heating coil to position a brazed joint of the assembly in the heating coil, a shaft extending through the housing on the opposite side of the coil from the clamp, a second clamp splined to the shaft for clamping a second part of the magnetron assembly, a carriage supporting the second clamp rotatably, means guiding the carriage for movement parallel to the axis of the shaft, means for urging the carriage away from the induction heating coil, and means for pressing the carriage toward the induction heating coil against the action of the urging means.

9. An apparatus for disassembling brazed magnetron parts, which comprises a chamber, means for introducing gas under pressure into the chamber, an induction heating coil positioned between the ends of the chamber, means for clamping one part of a magnetron assembly on one side of the induction heating coil to position a brazed joint of the assembly in the heating coil, a shaft extending through the housing on the opposite side of the coil from the clamp, a second clamp splined to the shaft for clamping a second part of the magnetron assembly, a carriage supporting the second clamp rotatably, means guiding the carriage for movement parallel to the axis of the shaft, means for urging the carriage away from the induction heating coil, a bearing extending through a side of the chamber, and a crank shaft mounted rotatably in the bearing for pressing the housing toward the induction heating coil.

References Cited in the file of this patent

UNITED STATES PATENTS

| | | |
|---|---|---|
| 1,900,017 | Kennedy | Mar. 7, 1933 |
| 2,494,870 | Greiner | Jan. 17, 1950 |
| 2,509,181 | Zimmerman | May 23, 1950 |
| 2,522,949 | Jarman | Sept. 19, 1950 |
| 2,551,402 | Vinson | May 1, 1951 |
| 2,653,210 | Becker et al. | Sept. 22, 1953 |
| 2,715,298 | Buttino | Aug. 16, 1955 |